(12) United States Patent
Lin

(10) Patent No.: US 7,707,336 B2
(45) Date of Patent: Apr. 27, 2010

(54) UNIVERSAL SERIAL BUS (USB) SYSTEM WITH SINGLE PORT AND HOST CONTROLLER THEREOF

(75) Inventor: Chih-Jou Lin, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 415 days.

(21) Appl. No.: 10/906,683

(22) Filed: Mar. 2, 2005

(65) Prior Publication Data

US 2006/0064521 A1 Mar. 23, 2006

(51) Int. Cl.
*G06F 5/00* (2006.01)
*G06F 13/20* (2006.01)
(52) U.S. Cl. ........................ 710/60; 710/313
(58) Field of Classification Search .................. 710/313
See application file for complete search history.

(56) References Cited

U.S. PATENT DOCUMENTS

2003/0208651 A1* 11/2003 Wurzburg ................... 710/303
2004/0260850 A1* 12/2004 Yu et al. ..................... 710/104
2006/0053244 A1* 3/2006 Fruhauf et al. .............. 710/313

* cited by examiner

*Primary Examiner*—Henry W. H. Tsai
*Assistant Examiner*—Juanito C Borromeo
(74) *Attorney, Agent, or Firm*—Winston Hsu

(57) ABSTRACT

A universal serial bus (USB) with single port and a host controller thereof are provided. The USB comprises a USB port, a speed detection circuitry, a start of frame (SOF) generator, and a host controller. The USB port is electrically coupled to an external circuitry. The speed detection circuitry is electrically coupled to the USB port for detecting a transmission speed between the USB and the external circuitry via the USB port to provide a detecting result. The SOF generator is electrically coupled to the speed detection circuitry for receiving the detecting result and outputting a SOF signal, to determine a cycle of the SOF signal based on the detecting result. The host controller is electrically coupled to the SOF generator and the speed detection circuitry for adjusting the host controller based on SOF signal cycle to comply with the USB 2.0, USB 1.1 and USB 1.0 transmission standards.

6 Claims, 3 Drawing Sheets

| Bit 31 30 29 28 27 26 25 24 23 22 21 20 19 18 17 16 15 14 13 12 11 10 9 8 7 6 5 4 3 2 1 0 | | | | | Address |
|---|---|---|---|---|---|
| Next link pointer | | | 0 | TyP \| T | 03-00H |
| Status | transaction 0 length | ioc | PG* | transaction 0 offset | 07-04H |
| Status | transaction 1 length | ioc | PG* | transaction 1 offset | 0B-08H |
| Status | transaction 2 length | ioc | PG* | transaction 2 offset | 0F-0CH |
| Status | transaction 3 length | ioc | PG* | transaction 3 offset | 13-10H |
| Status | transaction 4 length | ioc | PG* | transaction 4 offset | 17-14H |
| Status | transaction 5 length | ioc | PG* | transaction 5 offset | 1B-18H |
| Status | transaction 6 length | ioc | PG* | transaction 6 offset | 1F-1CH |
| Status | transaction 7 length | ioc | PG* | transaction 7 offset | 23-20H |
| Buffer pointer (page 0) | | | EndPt \| R | Device address | 27-24H |
| Buffer pointer (page 1) | | | I/O | Maximum pack size | 2B-28H |
| Buffer pointer (page 2) | | | | Reserved \| Mult | 2F-2CH |
| Buffer pointer (page 3) | | | | Reserved | 33-30H |
| Buffer pointer (page 4) | | | | Reserved | 37-34H |
| Buffer pointer (page 6) | | | | Reserved | 3B-38H |
| Buffer pointer (page 7) | | | | Reserved | 3F-3CH |

FIG. 3

UNIVERSAL SERIAL BUS (USB) SYSTEM WITH SINGLE PORT AND HOST CONTROLLER THEREOF

BACKGROUND OF THE INVENTION

1. Field of the Invention

The present invention relates to a universal serial bus (USB), and more particularly, to a USB system with single port which supports the high speed (HS), full speed (FS), and low speed (LS) protocols and a host controller thereof.

2. Description of the Related Art

Computer systems are conventionally connected to various peripheral devices via different kinds of connection interface. For example, a modem and a mouse are connected through a serial port, a printer is connected through a parallel port, and so on. The various I/O interfaces have different specification and is thus hard to manage. In addition, the computer needs to be shut down before connecting or disconnecting the peripheral device, which is inconvenient to users.

Therefore, a universal serial bus (USB) standard has been defined by the industry for supporting the plug and play (PNP) installation function. Since the USB is designed as hot-pluggable, the computer can use the peripheral device via the USB without shutting down or rebooting the computer system. Many electronic devices have the USB interface, such as keyboard, scanner, USB pen disk, and digital camera, etc.

Along with the development in technology and users' different requirement, the previously defined USB standard (such as USB 1.0 and USB 1.1) no longer satisfies the current needs, thus a new USB 2.0 standard is further defined. Regarding the USB 2.0 host controller standard, please refer to the "Enhanced Host Controller Interface Specification for Universal Serial Bus," version 1.0, published by Intel Corp. on Mar. 12, 2002. Thus, details are not repeated herein.

The enhanced host controller interface (EHCI) in the new USB 2.0 specification provides asynchronous and isochronous data stream. The asynchronous data stream is managed by a queue head (QH) and a queue element transfer descriptor (qTD). The isochronous data stream is managed by an isochronous transaction descriptor (iTD). Two scheduling interfaces including a periodic interface and an asynchronous interface are used in the EHCI to manage all data streams. The periodic scheduling interface is based on a time-oriented frame list, which displays a sliding window indicating the time of task in the host controller. The asynchronous scheduling interface is a simple round-robin list of the scheduled task, wherein the round-robin list provides the round-robin service opportunity for all asynchronous transmission. The EHCI host controller provides an automatic and sequential data transmission stream in a cycle of every 125 µs (micro second) by the periodic scheduling and then the asynchronous scheduling.

However, the previous USB 1.0/1.1 standards is very different from and the new USB 2.0 standard. For example, a cycle of each data frame defined in the USB 1.0 and USB 1.1 standards is 1 ms (mini second), whereas a cycle of each data frame defined in the USB 2.0 standard is 125 µs (micro second). In order to make the system suitable for the peripheral devices in the USB 1.0, USB 1.1 and USB 2.0 standards, two USB host controllers (suitable for USB 1.0/1.1 and USB 2.0, respectively) are disposed in the system, so as to activate the corresponding USB host controller for accessing data according to the type of USB device it connects. Accordingly, the hardware disposition is complicated and manufacture cost of the USB is rather high.

SUMMARY OF THE INVENTION

Therefore, it is an object of the present invention to provide a universal serial bus (USB) system with single port, which only uses one USB controller and is suitable for USB 1.0, USB 1.1, and USB 2.0 standards.

It is another object of the present invention to provide a USB host controller using the Enhanced Host Controller Interface (EHCI) in USB 2.0 standard and applicable in both the USB 1.1 and USB 1.0 standards.

A universal serial bus (USB) with single port is provided in the present invention. The USB system with single port comprises a USB port, a speed detection circuitry, a start of frame (SOF) generator, and a host controller. Wherein, the USB port is electrically coupled to an external circuitry. The speed detection circuitry is electrically coupled to the USB port for detecting a transmission speed between the USB system and the external circuitry via the USB port and provides a detecting result. The SOF generator is electrically coupled to the speed detection circuitry for receiving the detecting result and outputting a SOF signal, and also determines a cycle of the SOF signal based on the detecting result. The host controller is electrically coupled to the SOF generator and the speed detection circuitry for adjusting the host controller based on the cycle of the SOF signal, so as to comply with the transmission standards of USB 2.0, USB 1.1 and USB 1.0.

In the USB system with single port according to an embodiment of the present invention, the speed detection circuitry mentioned above detects whether the transmission speed of the USB port is high speed (HS), full speed (FS), or low speed (LS). For example, when the cycle of the SOF signal is about 125 µs, the host controller enables the full function to process the high-speed USB; when the cycle of the SOF signal is about 1 ms, the host controller disables part of the functions to process the full-speed and low-speed USB.

In the USB system with single port according to the embodiment of the present invention, the host controller mentioned above is a controller complying with the USB 2.0 EHCI (Enhanced Host Controller Interface) standard. Wherein, the host controller is adjusted by masking part of its functions.

A host controller is provided in the present invention for receiving a SOF signal and further adjusting the host controller according to the cycle of the received SOF signal, such that the host controller can comply with the transmission standards of USB 2.0, USB 1.1 and USB 1.0.

In the host controller according to the embodiment of the present invention, wherein when the cycle of the SOF signal is about 125 µs, the host controller enables its full function to process the high-speed USB; when the cycle of the SOF signal is about 1 ms, the host controller disables part of its functions to process the full-speed and low-speed USB.

The host controller according to an embodiment of the present invention is a controller complying with the USB 2.0 EHCI (Enhanced Host Controller Interface) standard. Wherein, the host controller is adjusted by masking part of its functions.

The present invention only uses one USB host controller using an Enhanced Host Controller Interface (EHCI) complying with USB 2.0 standard, and is applicable in both the USB 1.1 and USB 1.0 standards. Accordingly, the present invention is suitable for various peripheral devices complying with the standards of USB 1.0, USB 1.1 and USB 2.0. Especially for the On-The-Go (OTG) single port device that is most suitable for the present invention.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 3 schematically shows a data structure of the isochronous transaction descriptor (iTD) in USB 2.0 EHCI.

DESCRIPTION OF THE EMBODIMENTS

The enhanced host controller interface (EHCI) for the USB 2.0 provides an asynchronous data stream and an isochronous data stream. The asynchronous data stream is managed by a queue head (QH) and a queue element transfer descriptor (qTD). The isochronous data stream is managed by an isochronous transaction descriptor (iTD). Two scheduling interfaces including a periodic interface and an asynchronous interface are used in the EHCI to manage all data streams. The periodic scheduling interface is based on a time-oriented frame list, which is used to display a sliding window indicating the time of the task in the host controller. The asynchronous scheduling interface is a simple round-robin list of the scheduled task, wherein the round-robin list provides the round-robin service opportunity for all asynchronous transmission. The EHCI host controller provides an automatic and sequential data transmission stream in a cycle of every 125 μs (micro second) by the periodic scheduling first and then the asynchronous scheduling.

Figure 1:
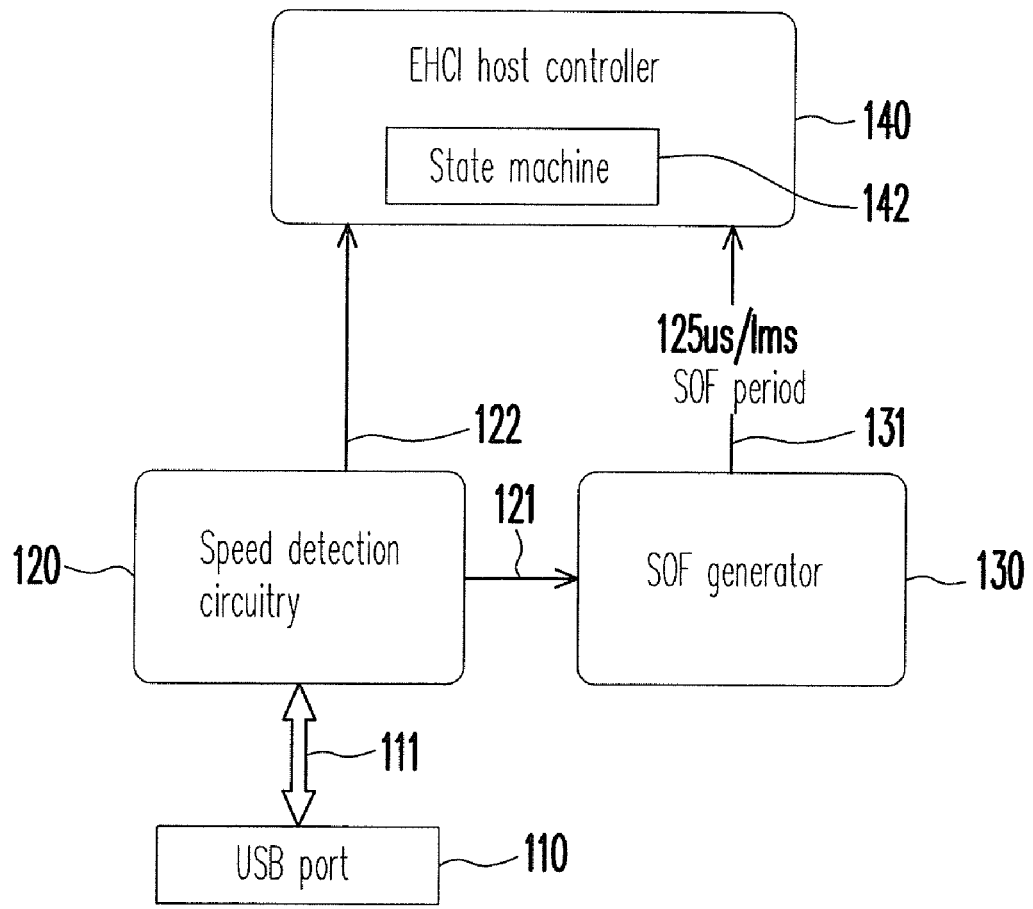
FIG. 1 schematically shows a block diagram of a USB system with single port according to an embodiment of the present invention.

FIG. 1 schematically shows a block diagram of a USB system with single port according to an embodiment of the present invention. The USB system with single port 100 comprises a single USB port 110 for connecting with external USB devices. The speed detection circuitry 120 is electrically coupled to the USB port 110 for detecting a transmission speed of a signal 111 transmitted by the external USB device through the USB port 110, so as to output the detecting results 121 and 122. A start of frame (SOF) generator 130 receives the detecting result 121 and outputs a SOF signal 131.

The cycle of the SOF signal 131 is determined by the detecting result 121. When it is detected by the speed detection circuitry 120 that the signal 111 is a high speed signal, the cycle of the SOF signal 131 is about 125 μs. Whereas, if it is detected by the speed detection circuitry 120 that the signal 111 is a full speed or low speed signal, the cycle of the SOF signal 131 is about 1 ms.

The host controller 140 may be a controller complying with the USB 2.0 EHCI standard. The EHCI host controller 140 supports both the asynchronous transmission and the periodic transmission. When the EHCI controller 140 receives the SOF signal from the SOF generator 130 and recognizes the speed information from the detecting result 122 generated by the speed detection circuitry 120, it is determined whether to mask part of the functions in QH and iTD and adjust the state machine inside the EHCI host controller 140 for processing a signal of USB 2.0 or USB 1.1/1.0.

Figure 2:
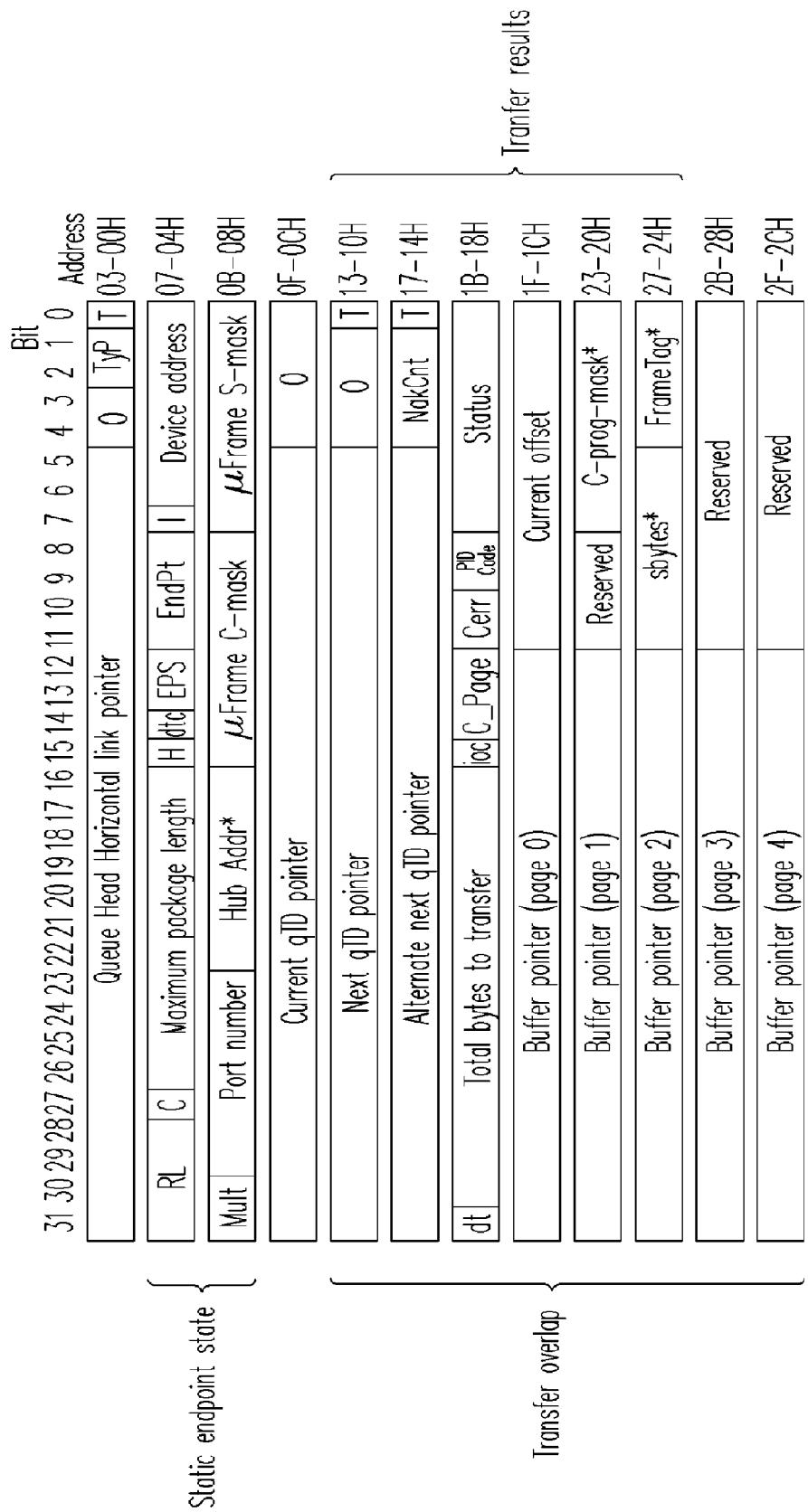
FIG. 2 schematically shows a data structure of the queue head (QH) in USB 2.0 EHCI.

Please refer to FIGS. 2 and 3 for part of the functions in QH and iTD mentioned above. FIGS. 2 and 3 schematically show data structures of the QH and iTD inside the USB 2.0 EHCI, respectively. Regarding the details of the QH and iTD data structures, please refer to the "Enhanced Host Controller Interface Specification for Universal Serial Bus," version 1.0, published by Intel Corp. on Mar. 12, 2002. Thus, details are not repeated herein.

The QH data structure shown in FIG. 2 is more reliable when it is designed for high speed USB transmission. When the EHCI host controller 140 recognizes that the detecting result of the speed detection circuitry 120 is full speed or low speed, the functions of Mult (high bandwidth pipelined multiplier) and RL (counting of the reloaded negative response character) in the QH data structure are both masked, and the EPS (End Point Speed) is set to a reserved state. Meanwhile, all other information is suitable for processing the USB transmission.

The iTD data structure shown in FIG. 3 is designed for high speed USB transmission. When the EHCI host controller 140 recognizes the detecting result of the speed detection circuitry 120 is high speed, only the first iTD transmission field (address is 0x04) is executed for USB transmission. Other iTD transmission fields (address from 0x08 to 0x20) are neglected.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A USB system with single port connecting to an external circuitry, comprising:

a USB port for connecting to the external circuitry;

a speed detection circuitry electrically coupled to the USB port for detecting a transmission speed between the USB system and the external circuitry via the USB port, and outputting a first detecting result and a second detecting result;

a start of frame (SOF) generator electrically coupled to the speed detection circuitry for receiving the second detecting result directly from the speed detection circuitry and outputting a SOF signal, and determining a cycle of the SOF signal based on the second detecting result; and a host controller electrically coupled to the SOF generator and the speed detection circuitry for receiving the SOF signal directly from the SOF generator and the first detecting result from the speed detection circuitry, wherein the host controller has a state machine, wherein the host controller masks a part of functions in a queue head and an isochronous transaction descriptor and adjusts the state machine based on the first detecting result, and the host controller is adjusted based on the cycle of the SOF signal received from the SOF generator to make the USB system comply with the standards of USB 2.0, USB 1.1 and USB 1.0, wherein the speed detection circuitry detects whether the transmission speed of the USB port is high speed (HS), full speed (FS), or low speed (LS), wherein when the host controller determines that the first detecting result is the full speed or the low speed, a high bandwidth pipelined multiplier and a counting of the reloaded negative response character among the functions in the queue head are both masked, and an end point speed function among the functions in the queue head is set to a reserved state.

2. The USB system with single port connecting to the external circuitry of claim 1, wherein when the cycle of the SOF signal is about 125 μs, the host controller enables the full function to process the high-speed USB.

3. The USB system with single port connecting to the external circuitry of claim 1, wherein when the cycle of the SOF signal is about 1 ms, the host controller disables part of its functions to process the full-speed and low-speed USB.

4. The USB system with single port connecting to the external circuitry of claim 1, wherein the host controller is a controller complying with the USB 2.0 EHCI (Enhanced Host Controller Interface) standard.

5. The USB system with single port connecting to the external circuitry of claim 4, wherein the host controller is adjusted by masking part of its functions.

6. A USB system with single port connecting to an external circuitry, comprising:
   a USB port for connecting to the external circuitry;
   a speed detection circuitry electrically coupled to the USB port for detecting a transmission speed between the USB system and the external circuitry via the USB port, and outputting a first detecting result and a second detecting result;
   a start of frame (SOF) generator electrically coupled to the speed detection circuitry for receiving the second detecting result directly from the speed detection circuitry and outputting a SOF signal, and determining a cycle of the SOF signal based on the second detecting result; and
   a host controller electrically coupled to the SOF generator and the speed detection circuitry for receiving the SOF signal directly from the SOF generator and the first detecting result from the speed detection circuitry,
   wherein the host controller has a state machine,
   wherein the host controller masks a part of functions in a queue head and an isochronous transaction descriptor and adjusts the state machine based on the first detecting result, and the host controller is adjusted based on the cycle of the SOF signal received from the SOF generator to make the USB system comply with the standards of USB 2.0, USB 1.1 and USB 1.0,
   wherein the speed detection circuitry detects whether the transmission speed of the USB port is high speed (HS), full speed (FS), or low speed (LS),
   wherein when the host controller determines that the first detecting result is the high speed, a first transmission field in the isochronous transaction descriptor is executed for a USB transmission and other transmission fields in the isochronous transaction descriptor are neglected.

* * * * *